UNITED STATES PATENT OFFICE.

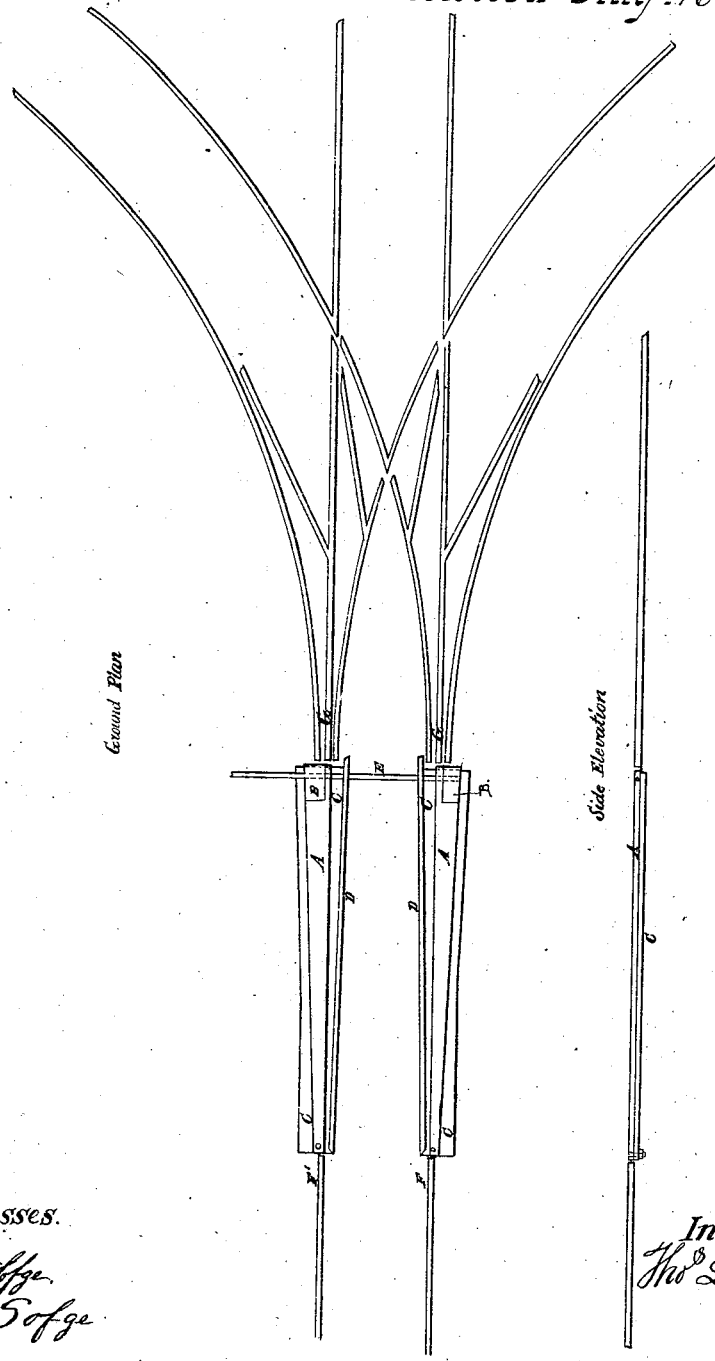

THOMAS DOUGHERTY, OF MACON, GEORGIA.

SWITCH FOR RAILROADS.

Specification of Letters Patent No. 25,101, dated August 16, 1859.

*To all whom it may concern:*

Be it known that I, THOMAS DOUGHERTY, of Macon, in the county of Bibb and State of Georgia, have invented a new and Improved Safety Switch-Rail; and I do hereby declare that the following is a full and exact description of the construction and operation of the same, reference being had to the annexed drawings, making a part of this specification, in which—

Figure 1 ground plan; Fig. 2 side elevation.

The nature of my invention consists of two movable flat bars of iron or steel, for the purpose of preventing the train from running off the rails when the switch is wrong.

To enable others skilled in the art to make and use my invention, I will proceed to describe its construction and operation.

A is the movable flat bar, which guides the wheels to any of the tracks.

B is an incline, upon which the flange mounts A when the switch is wrong.

C is a stationary cast iron bed on which moves the bar A when in use.

D is a flange or guide rail cast upon C to prevent the wheels mounting and to guide to the main track when the switch is wrong.

E is one of three or more connecting rods to join the bars A together extending to switch lever.

The object of the switch is for any number of rails G and provided should the switch be wrong, to guide the wheels and lead them safetly to the main track mark F.

What I claim as my invention and desire to secure by Letters Patent is—

The combination and arrangement of the flat bars A, A, and the stationary bed plates C, C, provided with the guide rails D, D, in connection with the rails, G, when constructed and operated substantially as and for the purpose above set forth.

THOS. DOUGHERTY.

Witnessed by—
F. M. SOFGE,
C. E. SOFGE.